March 12, 1957  W. C. VON BERG  2,784,443
DOOR RETAINING MEANS
Filed April 12, 1954

W. C. von Berg
by A. John Michel
ATTORNEY

United States Patent Office 2,784,443
Patented Mar. 12, 1957

2,784,443
DOOR RETAINING MEANS

Wilfred Clement Von Berg, Johannesburg, Transvaal, Union of South Africa

Application April 12, 1954, Serial No. 422,637

Claims priority, application Union of South Africa May 25, 1953

2 Claims. (Cl. 16—85)

This invention relates to means mounted in a fixed position on the floor for temporarily retaining a door in an open position.

In accordance with the invention, a door retaining means comprises a strip of spring steel or like resilient material one end of which is adapted to be secured to the floor as by a screw or screws, said strip being shaped to provide towards its free end a ramp and, rearward of the ramp, a surface which is engageable with the bottom portion of the door and which serves to retain the door in an open position through a frictional force exerted by the reaction of the resilient strip, or which, in the alternative, serves as an abutment to resist a closing movement of the door once it has passed over the aforesaid surface.

The aforesaid strip may be associated with a rubber or other resilient door stop of conventional design, the arrangement being such that the door stop is positioned over the fixed end of the strip and a single screw passes through both the door stop and the strip to secure them to the floor.

Preferably, the leading or free end of the strip is curved or bent slightly upwards to minimise the risk of its digging into the floor or floor covering when the resilient material is compressed by the door riding onto or over it.

If desired, the fixed end of the strip may be provided with means adapted to coact with the floor to prevent lateral turning movement of the strip especially when secured to the floor by a single screw. To this end, the corners of the strip at the fixed end thereof may be turned down to form a pair of sharp points which are pressed into the floor upon the securing screw or screws being tightened down.

Whilst it is not desired to restrict the shape of the strip, two forms of door retaining means will be described purely by way of example with reference to the accompanying drawing in which.

Figure 1:
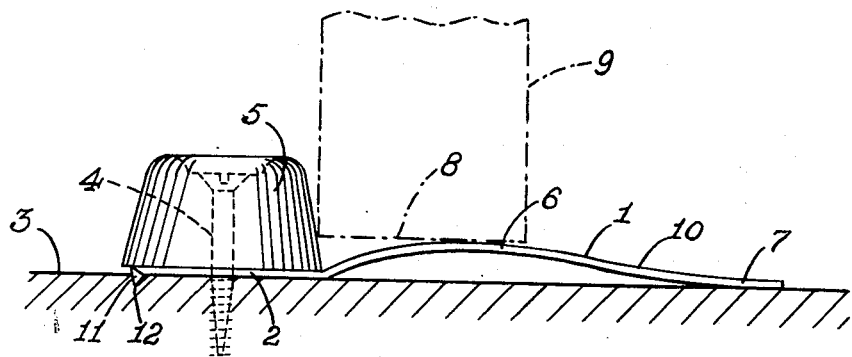
Figure 1 is a side elevation of one form of door retaining means showing its relationship with respect to the floor and a door.
Figure 2:
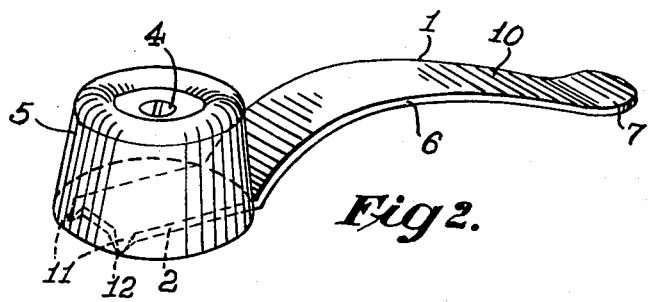
Figure 2 is a perspective view of the door retaining means shown in Figure 1.

Referring to Figures 1 and 2, the door retaining means comprises a spring-steel strip 1 having a flat portion 2 which is arranged to rest upon the floor 3 and to be secured thereto by a screw 4 passing through it and through a rubber or other door stop 5 superimposed upon the flat portion 2. The remainder 6 of the strip 1 is bow-shaped to present a convex surface when viewed from above and the free end 7 is curved slightly upwards. When the strip is not engaged by the door, the height of the apex of the bow-shaped portion 6 above the floor 3 is greater than the clearance between the floor 3 and the underside 8 of the door 9. The strip 1 is mounted so that when the door 9 engages with it, it will lie substantially at right-angles to the plane of the door. When the door is opened towards the strip 1 it rides up the ramp 10 constituted by the frontal part of the bow-shaped portion 6, and when its undersurface 8 engages on the apex of the bow-shaped portion 6, further movement of the door is arrested by the door stop 5. The door 9 is retained in this position by the frictional force between the upper surface of the compressed strip 1 and the underside 8 of the door 9.

In order to prevent lateral turning movement of the strip 1 about the screw 4, the corners 11 of the flat portion 2 are turned down to form a pair of sharp points 12 which dig into the floor when the screw 4 is tightened down.

Figure 3:
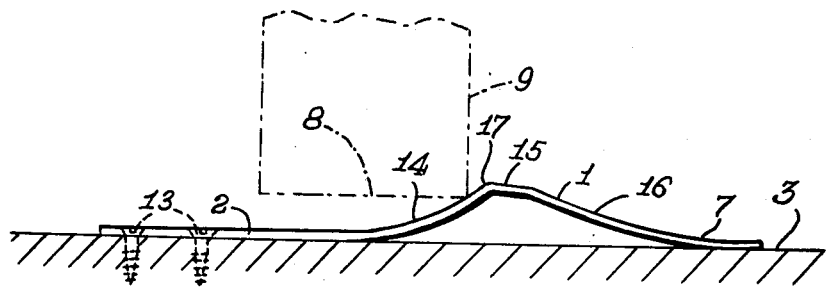
Figure 3 is a side elevation of another form of door retaining means showing its relationship with respect to a floor and a door.
Figure 4:
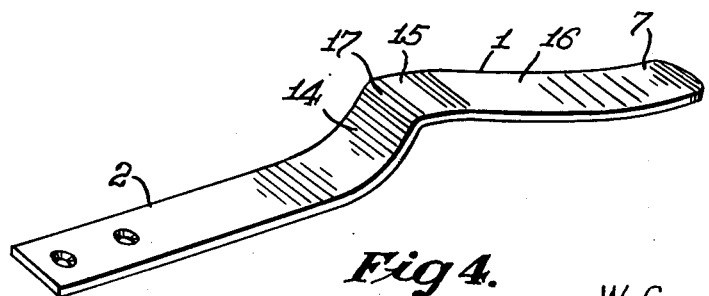
Figure 4 is a perspective view of the door retaining means shown in Figure 3.

Referring now to Figures 3 and 4 in which like numerals denote like parts, the strip 1 comprises a similar flat portion 2 which, in this case, is secured to the floor by means of a pair of screws 13. The flat portion 2 merges into an upwardly inclined part 14, then into a slightly downwardly inclined part 15, and finally into a smooth downward curve 16 towards the floor 3. Here again, the free extremity 7 is curved slightly upwards. In this case, the door 9 is allowed to pass over the transverse ridge 17 between the aforesaid upwardly and slightly downwardly inclined parts 14 and 15 respectively, and is retained by it.

It will be noted that since a pair of screws 13 are employed to fix the strip 1 to the floor 3, no other means, such as the turned down corners 11 shown in Figures 1 and 2, are necessary for preventing lateral turning of the strip 1.

I claim:

1. A door stop and holder adapted to be mounted on a floor for engagement with an opened door, consisting of a strip of resilient material having two ends in substantially the same plane and an upwardly arched center portion forming a ramp for the door when the same is opened into engagement therewith, one end of the strip being substantially flat for flush contact with the floor, means for fixedly securing the flat strip end to the floor, a resilient door stop mounted above the fixed flat end of the strip, the other end of the strip adjacent the ramp portion of the strip being in slidable contact with the floor when the door stop and holder is mounted thereon, and said arched center portion including a retaining surface to engage and hold in position the door when the latter is swung over and past the ramp.

2. The door stop and holder of claim 1, wherein the slidable end of the strip is slightly upwardly curved away from the floor.

References Cited in the file of this patent

UNITED STATES PATENTS

| | | |
|---|---|---|
| 652,659 | Blackwell | June 26, 1900 |
| 886,503 | Hightower | May 5, 1908 |
| 1,006,788 | Price | Oct. 24, 1911 |
| 1,040,887 | Coffman | Oct. 8, 1912 |

FOREIGN PATENTS

| | | |
|---|---|---|
| 263,600 | Switzerland | Sept. 15, 1949 |